June 10, 1969 C. F. WHEATLEY, JR 3,449,622

TELEVISION DEFLECTION CIRCUITS

Filed March 26, 1965

INVENTOR.
CARL F. WHEATLEY
BY
Eugene M. Whitacre
Attorney

United States Patent Office 3,449,622
Patented June 10, 1969

3,449,622
TELEVISION DEFLECTION CIRCUITS
Carl F. Wheatley, Jr., Somerset, N.J., assignor to Radio Corporation of America a corporation of Delaware
Filed Mar. 26, 1965, Ser. No. 443,034
Int. Cl. H01j *29/76*
U.S. Cl. 315—27 7 Claims

ABSTRACT OF THE DISCLOSURE

A protection circuit associated with the horizontal output transistor in a television receiver comprises a capacitor coupled in series relation with the transistor and with an associated output transformer. A limiting resistor is also incorporated between a high voltage filter capacitor and a high voltage rectifier coupled to the transformer. A voltage clamp is also coupled across the transistor.

This invention relates to television deflection circuits and in particular to a transistor horizontal deflection circuit which includes a high voltage circuit for producing the high direct accelerating voltage required for operation of the kinescope in a television receiver.

One of the major problems encountered in transistor deflection circuits relates to protecting the horizontal output transistor against high energy transients which accompany undesired arcing in the high voltage circuit. The high voltage circuit normally includes a step-up flyback transformer for developing high voltage pulses during the retrace portion of a horizontal deflection cycle. The circuit further includes the combination of a high voltage rectifier and a filter capacitor, the combination being coupled to the flyback transformer for producing from the high voltage pulses the desired high direct voltage. In accordance with present television receiver design practice, the high voltage filter capacitor advantageously may constitute the capacitance between the inner conductive coating (aquadag) of the kinescope and chassis ground. In a circuit of the type described arcing may occur as a result of (1) component failures or transients which momentarily exceed rated values for components in the high voltage circuit, (2) moisture in the vicinity of the high voltage circuit or, (3) in connection with servicing of the receiver, as a result of either intentional or unintentional grounding of high voltage terminals by the serviceman.

While such arcing is undesirable in any television receiver, it is of particular concern in connection with transistor television receivers since transistors are, in general, unable to withstand high energy surges without failure.

It is, accordingly, an object of the present invention to provide an improved horizontal deflection circuit for television receivers wherein the effects upon the horizontal output amplifier of high energy transients in the high voltage supply circuit are substantially reduced.

It is another object of this invention to provide circuit means for protecting a transistor horizontal deflection circuit against failure caused by high energy transients in an associated high voltage supply circuit.

It is another object of this invention to provide circuit means for protecting a transistor horizontal deflection circuit against failure caused by arcing in an associated high voltage rectifier during the trace portion of a deflection cycle.

It is another object of this invention to provide circuit means for protecting a transistor horizontal deflection circuit against failure caused by the high energy discharge which accompanies the production of an arc between a high voltage terminal in the television high voltage supply and a terminal at a substantially lower voltage (e.g. ground).

In accordance with the invention, a transistor deflection and high voltage supply circuit includes a step-up flyback transformer for providing high voltage retrace pulses to a rectifier-filter capacitor combination. The flyback transformer is coupled in circuit with a horizontal deflection output transistor by means of an energy absorbing coupling capacitor. The capacitor serves to decrease the coupling from the high voltage supply circuit to the horizontal output transistor in the event of arcing in the high voltage circuit and thereby protects the transistor.

In accordance with a further aspect of the invention, a surge limiting resistor is coupled in circuit with the high voltage rectifier and filter capacitor to reduce the peak currents which otherwise would be produced upon arcing in the high voltage rectifier. Still further, a unidirectionally conductive energy storage circuit comprising the combination of a parallel resistance-capacitance circuit and a diode is coupled to the horizontal output transistor to absorb excessive transient voltage spikes and thereby further protect the output transistor against failure.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
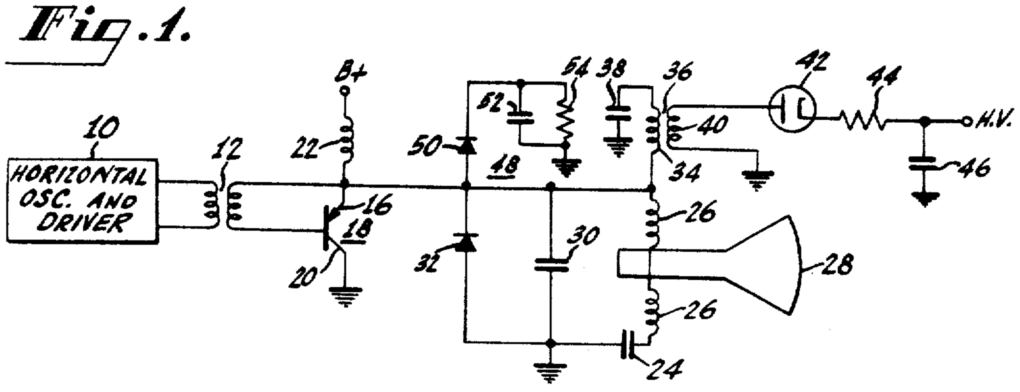
FIGURE 1 is a schematic circuit diagram of a portion of a transistor horizontal deflection circuit including a high voltage supply circuit for a television receiver embodying the present invention.

Referring to FIGURE 1 of the drawing, a transistor horizontal deflection and high voltage supply circuit comprises a suitably synchronized horizontal oscillator and driver circuit 10 which may, for example, include a suitable blocking oscillator configuration for generating voltage pulses at the television horizontal scanning frequency (e.g. 15,750 cycles per second). Amplified voltage pulses produced by circuit 10 are coupled by means of a transformer 12 to the input terminals, i.e. base 14 and emitter 16, of a horizontal output transistor 18. The collector 20 of transistor 18 is connected to a point of fixed reference potential such as chassis ground. The emitter 16 is coupled to a voltage supply (B+) by means of an inductor 22. The series combination of an "S"-shaping capacitor 24 and a horizontal deflection yoke 26 associated with an image-reproducing kinescope 28 is coupled between emitter 16 and collector 20 of transistor 18. A retrace capacitor 30 and a damper diode 32 each are coupled between emitter 16 and collector 20. A second series combination comprising an energy absorption capacitor 38 and the primary winding 34 of a flyback transformer 36 is also coupled between emitter 16 and collector 20. Transformer 36 includes a secondary voltage step-up winding 40 across which is coupled the series combination of a high voltage rectifier 42, a surge limiting resistor 44 and a high voltage filter capacitor 46. Filter capacitor 46 advantageously consists of the capacitance between the interval conductive coating (aquadag) of kinescope 28 and chassis ground. A unidirectionally conductive spike suppression circuit 48 comprising a diode 50 coupled in series with the parallel combination of a storage capacitor 52 and an energy dissipating resistor 54 is also coupled between emitter 16 and collector 20.

Figure 3:
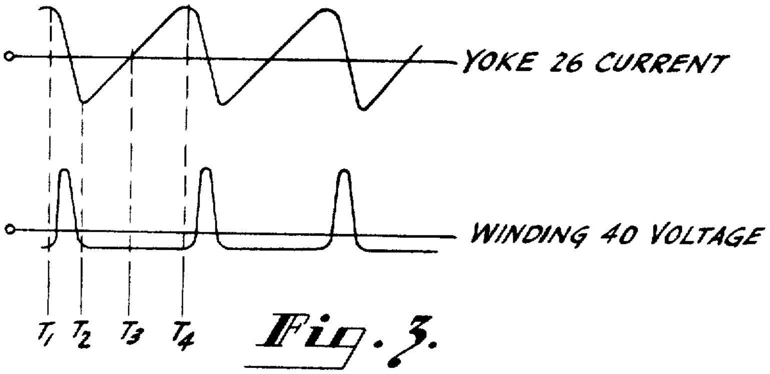
FIGURE 3 illustrates simplified waveforms of the type which may be observed in the circuit shown in FIGURE 1.

In operation, drive pulses recurring at the horizontal or line scanning frequency are applied from horizontal oscillator and driver circuit 10 via transformer 12 to the base 14 of horizontal output transistor 18. Stated simply, the drive pulses serve to switch the transistor 18 from an "on" or conductive condition at a time during the trace portion of the deflection cycle to an "off" or substantially non-conductive condition during the retrace portion of the deflection cycle. Referring to the waveforms shown in FIGURE 3, a complete horizontal deflection cycle will be described beginning at a time $T_1$, the beginning of the retrace portion of the cycle. At time $T_1$ the current flowing through deflection yoke 26, which at this time is supplied by transistor 18, has reached a maximum value in one direction such that the electron beam produced in kinescope 28 is deflected to one extreme edge of the screen thereof. Furthermore, at time $T_1$, a relatively small voltage exists between emitter 16 and collector 20 of transistor 18 and therefore appears across each of the circuits connected between those terminals (e.g. diode 32, capacitor 30, the combination of yoke 26 and capacitor 24, etc.). Upon application of a drive pulse to bsae 14, transistor 18 is driven rapidly to a non-conductive state. The relatively large current flowing through yoke 26 then flows into retrace capacitor 30. Capacitor 30, yoke 26 and additional circuit reactances, as will be explained below, are proportioned such that the current and voltage associated with yoke 26 oscillate through slightly in excess of one-half cycle during the retrace portion (i.e. between time $T_1$ and time $T_2$) of the deflection cycle. As is shown in FIGURE 3, the current through deflection yoke 26 reverses in direction during retrace so as to deflect the electron beam produced in kinescope 28 to the opposite edge of the screen. The peak voltage which is produced across the primary winding 34 of flyback transformer 36 during retrace is related to the relative durations of the trace and retrace portions of the deflection cycle and to the supply voltage B+. The flyback or retrace voltage pulse is stepped up by means of transformer 36 as is shown in FIGURE 3 and is applied to high voltage rectifier 42. The stepped-up flyback voltage pulse is rectified and filtered by means of rectifier 42 and capacitor 46 respectively to produce at the high voltage terminal labelled H.V. a voltage of, for example, 15,000 volts.

At time $T_2$, the voltage across capacitor 30 and therefore the voltage across diode 32 is of such a polarity and the current flowing in yoke 26 is in such a direction that substantially all of the linearly increasing yoke current passes through diode 32 in the forward direction. Diode 32 continues to pass substantially all of the yoke current during the initial portion of the deflection cycle while a relatively insignificant portion of the yoke current flows in the reverse direction through the substantially non-conductive transistor 18. As the yoke current passes through zero (at time $T_3$) diode 32 ceases conduction and transistor 18 conducts in the forward direction to supply the linearly increasing yoke current for the remaining portion (time $T_3$ to time $T_4$) of the deflection cycle. At time $T_4$ a drive pulse is again applied to the base 14 of transistor 18 and the deflection cycle is repeated.

Figure 2:
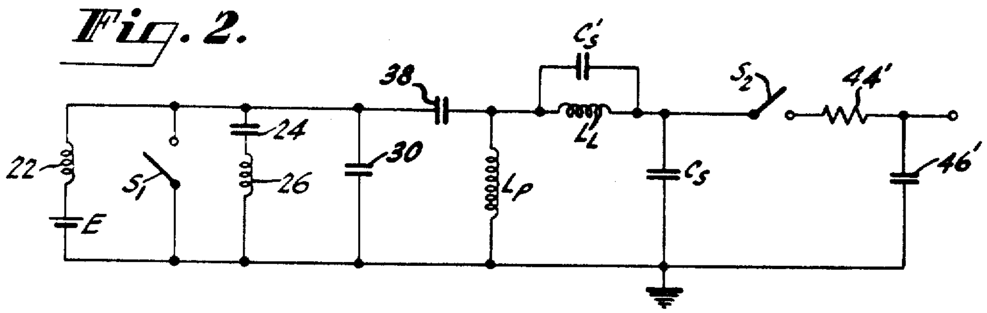
FIGURE 2 is a simplified equivalent circuit diagram of elements of the horizontal deflection circuit of FIGURE 1.

The practical deflection and high voltage supply circuit shown in FIGURE 1 may be approximated by the equivalent circuit shown in FIGURE 2 wherein all components are transformed to a common side of the flyback transformer 36. The switch labelled $S_1$, representative of the combined operation of transistor 18 and damper diode 32 as explained above, is closed during the trace portion and open during the retrace portion of each deflection cycle. The switch labelled $S_2$, representative of the high voltage rectifier 42, is closed during a small portion of retrace time and open during the remaining portion of the deflection cycle under normal operating conditions. One abnormal condition against which the present invention provides protection for transistor 18 occurs when switch $S_2$ (rectifier 42) closes while subjected to a high reverse voltage (e.g. during any part of the trace portion of a deflection cycle). Such an abnormal condition exists when spurious, internal arcing takes place in the high voltage rectifier as a result, for example, of flaking of the cathode material in rectifier 42. During trace, the high voltage rectifier 42 (switch $S_2$) is subjected to a reverse voltage made up of the sum of the high voltage across capacitor 46 (e.g. of the order of 15,000 volts) and the voltage appearing across secondary winding 40 (e.g. 1,500 volts). In a typical circuit configuration wherein the above-mentioned volts exist, filter capacitor 46 (represented by transformed capacitor 46' in FIGURE 2) stores approximately 50 millijoules of energy. If the high voltage rectifier 42 arcs during trace, the 50 millijoules of energy will be fed back via transformer 36 into the deflection circuit in a very short time interval. In accordance with the present invention, capacitor 38 is inserted in the series circuit shown in FIGURE 2 which includes filter capacitor 46', resistor 44', switch $S_2$ (rectifier 42), the parallel combination of the leakage inductance $L_L$ and the distributed winding capacitance $C_S'$ associated with secondary winding 40 of transformer 36 and the switch $S_1$ (representative of transistor 18). In the actual circuit shown in FIGURE 1, capacitor 38 is placed in series with the primary winding 34 of transformer 36. Capacitor 38 serves to protect transistor 18 against the large surge of energy supplied by capacitor 46 by effectively decoupling the transistor from at least a portion of that energy. The capacitance of capacitor 38 is selected substantially smaller than (e.g. one-tenth) the transformed capacitance of capacitor 46, thereby decreasing both the resonant period of the series circuit which includes capacitor 38, capacitor 46', inductance $L_L$ and capacitance $C_{S2}$ and the maximum current which flows therein. The dissipation required of transistor 18 is reduced as the maximum current is reduced, the addition of capacitor 38 therefore providing the desired protection for transistor 18. The capacitor 38 should, however, be selected with a capacitance value substantially larger than that of capacitor 30 so that the effect of capacitor 38 on the generation of high voltage is minimal. Surge limiting resistor 44 (shown as transformed resistor 44' in FIGURE 2) is also added to limit further the current which flows in the series circuit under the above conditions.

A second abnormal condition against which the present invention provides protection for transistor 18 occurs when a short circuit is placed across secondary winding 40. A short circuit may be effected or approached by the presence of high voltage arcing between ground and the high voltage terminal of secondary winding 40. Referring to FIGURE 2, such an arc effectively would remove from the circuit the equivalent capacitors 46' and $C_S$, the latter representing the transformed stray capacitance of the secondary winding 40. In a deflection circuit designed in accordance with current practices, the transformed leakage inductance $L_L$ is generally approximately one-half as large as the inductance of the deflection yoke 26. The primary inductance $L_P$ is substantially greater than either of the mentioned inductances and therefore may be considered to be an open circuit for purposes of the present discussion. If capacitor 38 were not included in the circuit, the arcing condition would modify the remainder of the circuit shown in FIGURE 2 so as to place the distributed capacitance $C_S'$ and the smaller inductance $L_L$ in parallel with the larger inductance of yoke 26 and in parallel with the capacitance of retrace capacitor 30. The capacitor 24 is of such a large value that it may be neglected for purposes of the present discussion. Since the duration of the retrace interval normally is determined by the duration of one half cycle of oscillation of the resonant circuit comprising yoke 26 and retrace capacitor 30, the arcing condition results in a change in the duration of the retrace oscillation. Furthermore, in the absence of capacitor 38, since the effective circuit inductance would be reduced by a factor of three, the retrace voltage pulse and peak current for transistor 18 each would be increased by a factor of two to three times which generally results in failure of transistor 18. In accordance with the present invention, the addition of capacitor 38 to the circuit serves to modify the resonant circuit under arcing conditions so as to maintain both the retrace voltage pulse amplitude and the peak current of transistor 18 at or below their normal levels despite arcing, thereby preventing failure of transistor 18.

Further abnormal conditions against which the present invention provides protection for transistor 18 occur when a short circuit is placed either between the cathode of rectifier 42 and ground or between the high voltage terminal (H.V.) and ground. The short circuit may be effected or approached by the presence of arcing between either of these points and ground. Neither of the last-mentioned arcing conditions affects the horizontal deflection circuit if such arcing takes place during the trace portion of a deflection cycle. During trace, diode 42 is reverse-biased as noted above and acts substantially as an open switch, thereby preventing any energy from being fed back into the horizontal deflection circuit. However, if either of the last-mentioned arcing conditions occurs during the retrace portion of a deflection cycle, the effect upon the horizontal deflection circuit is similar to the effect discussed above of a short circuit or arc across the secondary winding 40. Capacitor 38 therefore serves, as described above, to so modify the circuit as to substantially diminish the energy which must be dissipated by transistor 18, thereby preventing failure of transistor 18. Furthermore, in the case of arcing from the cathode of high voltage rectifier 42 to ground, the forward resistance of rectifier 42 is placed across secondary winding 40, providing a further small reduction in the energy to be dissipated in the deflection circuit. Similarly, in the case of arcing from the high voltage (H.V.) terminal to ground, a further resistance provided by resistor 44 is added in series with the forward resistance of rectifier 42 across secondary winding 40, still further reducing the dissipation requirements of the horizontal deflection circuit.

It has also been found to be advantageous, where abnormally high short duration voltage spikes may be reflected back to the emitter 16 of transistor 18, to provide further protection by means of the spike suppressor circuit 48. The capacitor 52 is chosen sufficiently large so that during the occurrence of an abnormal voltage transient, i.e., a transient exceeding the voltage stored on capacitor 52, diode 50 conducts so that the voltage at emitter 16 does not exceed the sum of the forward voltage drop of diode 50 plus the voltage stored on capacitor 52. The circuit 48 serves to clamp emitter 16 at the normal peak flyback voltage when such transients occur. Since the transient voltage spikes which are encountered in such a circuit are of short duration, the extent to which the voltage across capacitor 52 changes during such a spike is generally inconsequential. The excess voltage across capacitor 52 exceeding the normal peak flyback voltage is dissipated by means of resistor 54 after the termination of the transient spike.

In the case of each abnormal condition described above, the circuit returns to normal operation a short time after cessation of the arc or short circuit condition.

While the invention has been described in terms of a particular circuit configuration, various modifications may be made consistent with the present invention. For example, the circuit may include a flyback transformer of the autotransformer type, transistors of opposite type conductivity and a voltage supply of opposite polarity with respect to that shown may be utilized, or the circuit components may be coupled to the collector 20 rather than to emitter 16, the remaining output terminal of transistor 18 being grounded.

A typical embodiment of the invention such as is shown in FIGURE 1, includes the following components:

| | |
|---|---|
| B+ voltage supply | 34 volts. |
| Transistor **18** | RCA Type TA1928A. |
| Diode **32** | RCA Type TA1115. |
| Rectifier **42** | Type 1X2. |
| Diode **50** | Type 1N3254. |
| Yoke **26** | 200 microhenries. |
| Inductor **22** | 2 millihenries (at 2 amperes). |
| Capacitor **24** | 4 microfarads. |
| Capacitor **30** | 0.05 microfarads. |
| Capacitor **38** | 0.15 microfarads. |
| Capacitor **52** | 10 microfarads. |
| Capacitor **46** | 500 picofarads. |
| Resistor **44** | 150,000 ohms. |
| Resistor **54** | 1 megohm. |

What is claimed is:

1. In a television receiver, a horizontal deflection and high voltage supply circuit for an image reproducing device, comprising:

a horizontal deflection winding, switching means coupled to said deflection winding to provide a substantially linearly increasing deflection current flow through said winding during the trace portion of the horizontal deflection cycle of the receiver, a high voltage transformer coupled to said switching means for developing high voltage pulses during the retrace portion of the horizontal deflection cycle, high voltage supply means including a rectifier and a filter capacitor coupled to said transformer and responsive to said high voltage pulses for developing a high direct voltage, and capacitive energy absorbing means continuously coupled upon the occurrence of arcing in said high voltage supply means in the sole series conductive path comprising said switching means and said transformer for increasing the impedance from said high voltage supply means to said switching means upon said occurrence of arcing in said high voltage supply means.

2. In a television receiver, a horizontal deflection and high voltage supply circuit for an image reproducing device comprising:

a horizontal deflection winding, a retrace capacitor coupled to said winding, switching means coupled to said deflection winding to provide a substantially linearly increasing deflection current flow through said winding during the trace portion of the horizontal deflection cycle, a high voltage transformer coupled to said switching means for developing high voltage pulses during the retrace portion of the horizontal deflection cycle, high voltage supply means including a rectifier and a filter capacitor coupled to said transformer and responsive to said high voltage pulses for developing a high direct voltage, and capacitive energy absorbing means continuously coupled upon the occurrence of arcing in said high voltage supply means in the sole series conductive path comprising said switching means and said transformer for increasing the impedance from said high voltage supply means to said switching means upon said occurrence of arcing in said high voltage supply means, the capacitance of said energy absorbing means being greater than the capacitance of said retrace capacitor.

3. In a television receiver, a horizontal deflection and high voltage supply circuit for an image reproducing device according to claim 2 wherein the capacitance of said energy absorbing means is substantially less than the equivalent capacitance of said filter capacitor measured with both said capacitances transformed to a common side of said transformer.

4. In a television receiver, a horizontal deflection and high voltage supply circuit for an image reproducing device comprising:

a horizontal deflection winding, switching means coupled to said deflection winding to provide a substantially linearly increasing deflection current flow through said winding during the trace portion of the horizontal deflection cycle of the receiver, a high voltage transformer coupled to said switching means for developing high voltage pulses during the retrace portion of the horizontal deflection cycle, high voltage supply means including a rectifier, a current limiting resistor coupled to said rectifier and a filter capacitor coupled to said resistor, said supply means being coupled to said transformer and being responsive to said high voltage pulses for developing a high direct voltage, and capacitive energy absorbing means continuously coupled upon the occurrence of arcing in said high voltage supply means in the sole series conductive path comprising said switching means and said transformer for increasing the impedance from said high voltage supply means to said switching means upon said occurrence of arcing in said high voltage supply means.

5. In a transistor television receiver the combination of a horizontal deflection circuit including a transistor, a high voltage transformer having a primary winding coupled to said deflection circuit and a secondary winding inductively coupled to said primary winding, a high voltage rectifier coupled to said secondary winding, a high voltage filter capacitor coupled to said rectifier for developing a high direct voltage, and an energy absorbing capacitor continuously coupled upon the occurrence of arcing in the sole series conductive path comprising said primary winding of said transformer and said transistor, the capacitance of said energy absorbing capacitor being substantially smaller than the equivalent capacitance of said filter capacitor transformed to the primary side of said transformer.

6. In a transistor television receiver the combination of a transistor horizontal deflection circuit including a horizontal output transistor and the parallel combination of a deflection winding and a retrace capacitor coupled to said output transistor, a high voltage transformer having a primary winding coupled to said deflection circuit and a secondary winding inductively coupled to said primary winding, a high voltage rectifier coupled to said secondary winding, a high voltage filter capacitor coupled to said rectifier for developing a high direct voltage and an energy absorbing capacitor continuously coupled upon the occurrence of arcing in the sole series conductive path comprising said primary winding of said transformer and said transistor, the capacitance of said energy absorbing capacitor being substantially smaller than the equivalent capacitance of said filter capacitor transformed to the primary side of said transformer.

7. In a transistor television receiver, the combination of a transistor horizontal deflection circuit including a horizontal output transistor, a damper diode coupled across said output transistor, the series combination of a capacitor and deflection winding coupled across said output transistor and a retrace capacitor coupled across said output transistor, a high voltage transformer having a primary winding coupled to said output transistor and a secondary winding inductively coupled to said primary winding, a high voltage rectifier coupled to said secondary winding, a high voltage filter capacitor coupled to said rectifier for developing a high direct voltage, and an energy absorbing capacitor continuously coupled upon the occurrence of arcing in the sole series conductive path comprising said primary winding of said transformer and said output transistor, the capacitance of said energy absorbing capacitor being selected substantially smaller than the equivalent capacitance of said filter capacitor transformed to the primary side of said transformer but greater than the capacitance of said retrace capacitor so as to substantially reduce the energy transferred to said output transistor upon arcing in the secondary circuit of said high voltage transformer without deleterious effect on development of said high voltage.

References Cited

UNITED STATES PATENTS

| | | | |
|---|---|---|---|
| 3,302,056 | 1/1967 | Presig | 315—27 |
| 3,343,061 | 9/1967 | Hetterscheid | 315—27 |

RICHARD A. FARLEY, *Primary Examiner.*

JOSEPH G. BAXTER, *Assistant Examiner.*

Disclaimer 3,449,622.—*Carl F. Wheatley, Jr.*, Somerset, N.J. TELEVISION DEFLECTION CIRCUITS. Patent dated June 10, 1969. Disclaimer filed Mar. 27, 1972, by the assignee, *RCA Corporation.*

Hereby enters this disclaimer to all claims of said patent.

[*Official Gazette November 6, 1973.*]